(12) United States Patent
Sano et al.

(10) Patent No.: US 9,272,734 B2
(45) Date of Patent: Mar. 1, 2016

(54) COWL TOP COVER

(71) Applicant: NIHON PLAST CO., LTD., Fujinomiya-shi, Shizuoka (JP)

(72) Inventors: Chikara Sano, Fujinomiya (JP); Masaya Nakajima, Fujinomiya (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 0 days.

(21) Appl. No.: 14/262,446

(22) Filed: Apr. 25, 2014

(65) Prior Publication Data

US 2014/0319878 A1    Oct. 30, 2014

(30) Foreign Application Priority Data

Apr. 25, 2013  (JP) .................................. 2013-092081

(51) Int. Cl.
*B62D 25/08* (2006.01)
*B60S 1/52* (2006.01)
*B60H 1/28* (2006.01)

(52) U.S. Cl.
CPC ................ *B62D 25/081* (2013.01); *B60H 1/28* (2013.01); *B60S 1/52* (2013.01)

(58) Field of Classification Search
CPC .. B60R 2021/343; B60R 21/34; B60R 13/07; B60R 13/04; B60R 13/06; B60R 13/0815; B60R 13/0838; B60R 21/38; B60H 1/28; B60H 2001/00085; B60H 1/00021; B60H 1/00535; B60H 1/00835; B60J 10/02; B60J 1/02; B60J 10/0014; B60J 10/0045; B60J 10/081; B60J 1/004; B60J 1/006; B60J 1/04; B60J 5/0405; B60J 5/0431; B60J 5/0455

USPC ............ 296/192, 96.61, 187.09, 208, 203.02, 296/180.1, 187.04, 187.12, 193.02, 201

See application file for complete search history.

(56) References Cited

U.S. PATENT DOCUMENTS

| 2006/0186704 A1* | 8/2006 | Sakai et al. .................... 296/192 |
| 2012/0175913 A1* | 7/2012 | Makise et al. ................. 296/192 |
| 2013/0221705 A1* | 8/2013 | Sugishima et al. ........... 296/192 |

FOREIGN PATENT DOCUMENTS

| JP | 2002-211439 A | 7/2002 |
| JP | 2003-532574 A | 5/2003 |
| JP | 2011-073504 A | 4/2011 |
| WO | WO 01/85481 A1 | 11/2001 |

* cited by examiner

*Primary Examiner* — Glenn Dayoan
*Assistant Examiner* — Sunsurraye Westbrook
(74) *Attorney, Agent, or Firm* — Arent Fox LLP

(57) ABSTRACT

A cowl top cover of the present invention provides that hardly applies influence when a dimension error occurs to a component, on sealability between the cowl top cover and a bonnet hood, a performance of a washer nozzle. The cowl top cover of the present invention includes at least one bent part that is formed to be bent in a mountain-like and a valley-like shape in a vehicle height direction as viewed in a cross section orthogonal to a vehicle widthwise direction, and the bent part includes a flexural deformation structure with which it is possible to allow a locally flexural deformation in a vehicle lengthwise direction in the bent part and to enable expansion and contraction of a distance in the vehicle lengthwise direction between a locking pawl part disposed at first end of the cowl top cover and a seal member fixation part disposed at second end of the cowl top cover.

4 Claims, 5 Drawing Sheets

COWL TOP COVER

CROSS REFERENCE TO RELATED APPLICATIONS

This application claims priority of Japanese Patent Application No. 2013-092081 filed on Apr. 25, 2013. The contents of this application are incorporated herein by reference in their entirety.

BACKGROUND OF THE INVENTION

1. Field of the Invention

The present invention relates to a cowl top cover that covers a cowl part disposed between a windshield and a bonnet hood of an automotive.

2. Description of the Related Art

Generally, an automotive has, at a vehicle front part, an engine room in which an power engine is installed, and the right-and-left lateral surface parts of the engine room is covered with a fender panel, and the upper opening is covered with a freely openable bonnet hood.

Between a rear part of the bonnet hood of the automotive and a front end of a windshield, a cowl part is disposed to define a boundary between the engine room and a vehicle compartment, and the cowl top cover is attached to improve the appearance by covering the cowl part. Further, generally, the cowl top cover is provided with an air intake port (intake port) for introducing an outside air into the vehicle.

In a conventional cowl top cover, a panel fixation part disposed at a forward-side lower part is fixed to a vehicle body panel, and the cowl top cover is supported by the vehicle body panel. Further, at a forward-side upper part of the cowl top cover, an elastically deformable seal member is fixed. When the seal member adheres to a rear-end lower surface of the closed bonnet hood, the cowl top cover and the bonnet hood are sealed via the seal member, and thus, a heat or a bad smell of the power engine is prevented from being leaked out of the engine room.

On the other hand, at a rear end of the cowl top cover that faces the windshield, a glass engaging part is disposed which engages with the windshield to support the windshield, and the glass engaging part is formed in a clip-like shape so that the rear end of the cowl top cover is bifurcated. When the front end (lower end) of the windshield is inserted into the clip-like glass engaging part to hold the front end of the windshield, the rear end of the cowl top cover and the front end of the windshield are engaged.

An example of the cowl top cover having such a clip-like glass engaging part is disclosed in Japanese Unexamined Patent Application Publication No. 2002-211439 (hereinafter, referred to as "Patent Literature 1") and Japanese Unexamined Patent Application Publication No. 2011-73504 (hereinafter, referred to as "Patent Literature 2"), for example.

For example, the cowl top cover described in Patent Literature 1 includes: a clip-like glass engaging part at the rear end; a bent part that is disposed closer to the front end near a bonnet hood, obtained when the cowl top cover is viewed in a cross section orthogonal to a vehicle widthwise direction and that is formed to be bent in an approximately chevron V-shaped; and a plate part that is arranged to linearly extend from the bent part rearward. Further, at a front end of the plate part, which is rearward of the bent part of the cowl top cover, a deformed part is disposed which is obtained by thinning a plate part so as to facilitate elastic deformation.

In such a cowl top cover in Patent Literature 1, upon attachment of the cowl top cover to the cowl part, when the front end of the windshield is fitted into the glass engaging part of the cowl top cover to hold the front end of the windshield, the cowl top cover is forced and pressed down from the upper surface side and the deformed part disposed rearward of the bent part is thereby elastically deformed.

As a result, it is possible to change the orientation (angle) of the clip-like glass engaging portion disposed at the rear end of the cowl top cover, to a direction approximately equal to the inclination angle of the windshield, and this enables the cowl top cover to avoid interference with another vehicle body component so as to facilitate an engagement between the front end of the windshield and the glass engaging part of the cowl top cover. This facilitates a work of assembling a cowl top cover to a vehicle body, and it is thus possible to improve the productivity of an automotive.

On the other hand, as shown in FIG. 5, for example, a cowl top cover 60 described in Patent Literature 2 includes a clip-like glass engaging part 61 disposed at a rear end and a panel fixation part 62 disposed at a forward-side lower part and fixed to a vehicle body panel 71. Further, at a forward-side upper part, a seal member 72 for sealing a bonnet hood 73 is fixed.

Further, the cowl top cover 60 in Patent Literature 2 includes a mountain-like protrusion part (bent part) 63 that is disposed closer to a front end near the bonnet hood 73 and that protrudes upwardly, and at the backside of the protrusion part 63, a stiffening rib 64 formed along a vehicle lengthwise direction is arranged. Moreover, in Patent Literature 2, in the stiffening rib 64 arranged in the protrusion part 63, a slit-like gap 65 is formed from a distal end (apex) to a terminal end of the stiffening rib 64.

In the cowl top cover 60 of Patent Literature 2, the above-described slit-like gap 64 is formed in the stiffening rib 64, and thus, when the cowl top cover 60 receives a relatively strong impact, the cowl top cover 60 is capable of being elastically deformed so that the slit-like gap 65 is filled with the stiffening rib 64. As a result, the received impact is lessened and it is thereby possible to prevent the cowl top cover 60 and other components from being damaged.

Further, in Patent Literature 2, when the cowl top cover 60 receives a pressing force as a result of a deposit such as snow and ice being deposited on the cowl top cover 60, for example, the cowl top cover 60 is elastically deformed so that the gap 65 is filled; however, it is possible to regulate a deformation amount of the elastic deformation by an interval between the slit-like gaps 65. When the deformation amount of the elastic deformation of the cowl top cover 60 is thus regulated, it becomes possible to prevent disengagement between the clip-like glass engaging part 61 disposed at the rear end of the cowl top cover 60 and the front end of the windshield.

As in the above-described Patent Literature 1 and Patent Literature 2, the conventional cowl top cover often adopts, as a structure for engaging the front end of the windshield, a structure in which the clip-like glass engaging part is arranged at the rear end of the cowl top cover and the front end of the windshield is inserted therebetween and supported.

However, in this type of engagement structure, the front end of the windshield is clamped and supported by the clip-like bifurcated glass engaging part from an up-down directions, and thus, inevitably, the rear end of the cowl top cover is risen, by the thickness of at least the glass engaging part, relative to a glass surface of the windshield. When the rear end of the cowl top cover is risen relative to the windshield, a poor visual aspect ensues, and as a result, appearance quality of an automotive decreases.

Further, when the rear end of the cowl top cover is risen relative to the windshield, a foreign substance such as dust easily accumulates at a boundary part between the cowl top cover and the windshield, and as a result, there is a problem that a task of removing the accumulated foreign substance is complicated.

Therefore, Japanese Translation of PCT International Application Publication No. 2003-532574 (hereinafter, referred to as "Patent Literature 3") proposes an engagement structure in which the rear end of the cowl top cover is not risen relative to the glass surface of the windshield to ensure that the glass surface of the windshield and an outer surface at the rear end of the cowl top cover are disposed on the same plane.

The engagement structure described in Patent Literature 3 is configured such that a locking pawl part is arranged at the rear end of the cowl top cover, and a fitting member capable of fittingly attaching the locking pawl part of the cowl top cover is bonded to a lower surface of the front end of the windshield.

When such an engagement structure (fitting structure) using the fitting member of Patent Literature 3 is adopted, it becomes possible to arrange the glass surface of the windshield and the outer surface of the cowl top cover on the same plane. Thus, it is possible to improve the visual aspect at a boundary part between the windshield and the cowl top cover, and it is also possible to prevent accumulation of a foreign substance such as dust at the boundary part.

Generally, there is a permitted error in each dimension of an automotive body, a windshield, and a cowl top cover, and thus, it is required to absorb respective dimension errors when the cowl top cover is engaged with the windshield and is assembled into the vehicle body.

For example, as described in Patent Literature 1 and Patent Literature 2, when the clip-like glass engaging part is arranged at the rear end of the cowl top cover so as to engage the cowl top cover and the windshield, even when a dimension error occurs to a glass terminal or a vehicle body panel and thus a relative position between the glass terminal and the cowl top cover is shifted, it is possible to ensure that the front end of the windshield is stably held by the glass engaging part of the cowl top cover and it is thus possible to absorb a dimension error of each component.

However, in the engagement structure between the cowl top cover and the windshield as in Patent Literature 1 and Patent Literature 2, as described above, the rear end of the cowl top cover is risen relative to the glass surface of the windshield, and as a result, problems may occur such as decrease in appearance quality of an automotive and accumulation of a foreign substance.

On the other hand, as described in Patent Document 3, when the cowl top cover and the windshield are connected by using the fitting member, as described above, it is possible to arrange the glass surface of the windshield and the outer surface of the cowl top cover on the same plane.

In this case, however, the relative position between the cowl top cover and the windshield is fixed by the fitting member, and thus, there is a tendency of more of an influence of a dimension error occurring in each component such as the windshield and the cowl top cover, and as a result, the relative position between the windshield and the cowl top cover or the position of the cowl top cover relative to the vehicle body may easily be shifted.

As a result, the relative position of the seal member also is shifted, and a sealability between the cowl top cover and the bonnet hood may be lost. Further, a position of a through-hole for a washer nozzle formed in the cowl top cover is shifted and a surface angle of an attachment part of the washer nozzle is inclined, and thus, an injection direction of the washer nozzle is changed as a result of which a desired performance is not satisfied and a yield is decreased.

SUMMARY OF THE INVENTION

The present invention has been achieved in view of the above-described conventional problems and a specific object thereof is to provide a cowl top cover with which it is possible to arrange a glass surface of a windshield and an outer surface of the cowl top cover on the same plane and to have less of an influence on the sealability by a seal member with a bonnet hood and an influence on a performance of a washer nozzle even when a dimension error occurs to a component such as a windshield and a cowl top cover.

To achieve the foregoing object, a cowl top cover provided by the present invention is a cowl top cover that covers a cowl part disposed between a windshield and a bonnet hood of an automotive. As a basic configuration, the cowl top cover is primarily characterized by including: a locking pawl part disposed at first end of the cowl top cover in a vehicle lengthwise direction; a seal member fixation part for fixing a seal member, the seal member fixation part disposed at the second end of the cowl top cover in the vehicle lengthwise direction; at least one bent part disposed between the first end of the cowl top cover and the second end of the cowl top cover and that is formed to be bent in a mountain-like or a valley-like shape in a vehicle height direction as viewed in a cross section orthogonal to a vehicle widthwise direction; the first end of the cowl top cover being connected to a front end of the windshield via a fitting member to which the locking pawl part is fittingly attached; and the second end of the cowl top cover has sealing between a bonnet hood of the automotive via the seal member fixed to the seal member fixation part, wherein the bent part includes a flexural deformation structure with which it is possible to allow a locally flexural deformation in the vehicle lengthwise direction in the bent part and to enable expansion and contraction of a distance in the vehicle lengthwise direction between the locking pawl part and the seal member fixation part.

In the cowl top cover according to the present invention, the flexural deformation structure is, particularly preferably, configured such that the thickness of the bent part is locally thin.

Further, a stiffening rib is erected along a vehicle lengthwise direction at the back surface of the cowl top cover, and the flexural deformation structure may be configured such that a portion disposed on the bent part of the stiffening rib is locally cut or an erected height of a portion disposed on the bent part of the stiffening rib is locally lowered.

Further, in a predetermined region including the bent part of the cowl top cover, a lattice-like air intake port is disposed which is configured by: plurality first lattice parts disposed in line along a first direction; and a plurality second lattice parts disposed in line along a second direction different from the first direction, and the flexural deformation structure may be configured such that a portion disposed on the bent part of the first and second lattice parts is locally cut or an erected height in the portion disposed on the bent part of the first and second lattice parts is locally lowered.

At first end (rear end) of the cowl top cover in a vehicle lengthwise direction according to the present invention, a locking pawl part is arranged at the backside, and at the second end (front end) of the cowl top cover in the vehicle lengthwise direction, a seal member fixation part for fixing a seal member is disposed. In the first end of the cowl top cover provided with such a locking pawl part, when the locking pawl part is fittingly attached to the fitting member firmly adhering to the front end of the windshield, it is possible to connect the cowl top cover and the windshield so that a top surface (outer surface) of the cowl top cover and a glass surface of the windshield are disposed on the same plane (in other words, the both surfaces are in flush).

As a result, it is possible to improve the visual aspect at a boundary part between the windshield and the cowl top cover, and it is thus possible to improve the quality in appearance of an automotive and it is also possible to prevent accumulation of a foreign substance such as dust at the boundary part between the both components.

Further, a cover body part disposed between the first end of the cowl top cover and the second end of the cowl top cover of the present invention includes, as viewed in a cross section orthogonal to a vehicle widthwise direction, at least one bent part formed to be bent in a mountain-like or a valley-like shape in a vehicle height direction. Further, at least one of the bent parts includes a flexural deformation structure with which it is possible to facilitate locally flexural deformation in a vehicle lengthwise direction of the bent part as compared to other parts other than the bent part so as to allow a space at an inner peripheral side of the bent part to be expanded or contracted in a vehicle lengthwise direction. The cowl top cover of the present invention takes advantages of such a flexural deformation structure of the bent part, and thereby, it is possible to enable expansion and contraction of a distance in the vehicle lengthwise direction between the locking pawl part and the seal member fixation part.

As a result, even when a dimension error occurs to a component such as the windshield and the cowl top cover, or even if a fixation position of the windshield and the cowl top cover is relatively slightly shifted, the bent part of the cowl top cover is deformed in a vehicle lengthwise direction by taking advantage of the flexural deformation structure when the cowl top cover is attached to the vehicle body, it is thereby possible to effectively absorb the dimension error of the components and the positional shift between the windshield and the cowl top cover, and as a result, it is possible stabilize the relative position of the seal member fixation part disposed at the second end of the cowl top cover, and the relative position and the disposition angle of the through-hole and the attaching part of the washer nozzle fixed to the cowl top cover.

That is, it is possible to ensure that the disposition of the seal member and the washer nozzle fixed to the cowl top cover has less of an influence from the dimension error of a component such as a windshield in the cowl top cover of the present invention, and it is thereby possible to restrain the seal member and the washer nozzle from being deformed. Therefore, it is possible to stably ensure the sealability between the cowl top cover and the bonnet hood by the seal member, and it is possible to inject liquid such as water in a predetermined direction from the washer nozzle attached to the cowl top cover, so that it is possible to stably ensure a performance of the washer nozzle.

In such a cowl top cover of the present invention, when the thickness of the bent part is locally thinned, it is possible to inexpensively and simply include the flexural deformation structure in the bent part, and further, the flexural deformation structure of the bent part enables an easy absorption of a dimension error occurring in a component such as a windshield.

Further, in the present invention, when the stiffening rib is erected along a vehicle lengthwise direction at the back surface of the cowl top cover, the flexural deformation structure may also be configured in the bent part by locally cutting a portion disposed on the bent part of the stiffening rib or locally lowering an erected height of a portion disposed on the bent part of the stiffening rib.

That is, in the present invention, as described above, even when the rigidity of the cowl top cover is increased as a result of the stiffening rib being arranged, it is possible to inexpensively and simply include the flexural deformation structure in the bent part and it is thereby possible to easily absorb the dimension error of the component.

Further, in the present invention, when a lattice-like air intake port configured by plurality first lattice parts disposed in line along a first direction and a plurality second lattice parts disposed in line along a second direction different from the first direction is disposed in a predetermined region including the bent part of the cowl top cover, it is possible to inexpensively and simply configure, in the bent part, the flexural deformation structure also by locally cutting a portion disposed on the bent part of the first and second lattice parts or locally also lowering an erected height in the portion disposed on the bent part of the first and second lattice parts, and it is possible to easily absorb the dimension error of a component.

DESCRIPTION OF THE PREFERRED EMBODIMENTS

A preferred embodiment of the present invention will be described in detail with reference to the drawings on the basis of an embodiment, below. It should be noted that the present invention is not limited in any way to the embodiment described below, and as long as a configuration substantially identical to that of the present invention and a similar operation and effect are provided, various modifications may be possible.

First Embodiment

Figure 1:
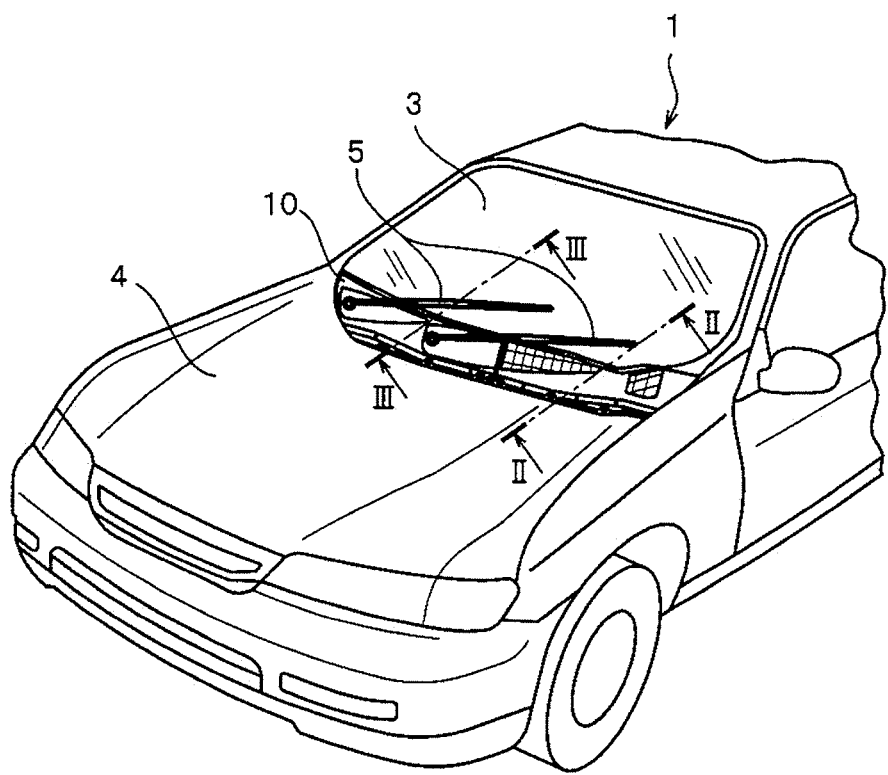
FIG. 1 is a perspective view showing a vehicle body front part of an automotive.
Figure 2:
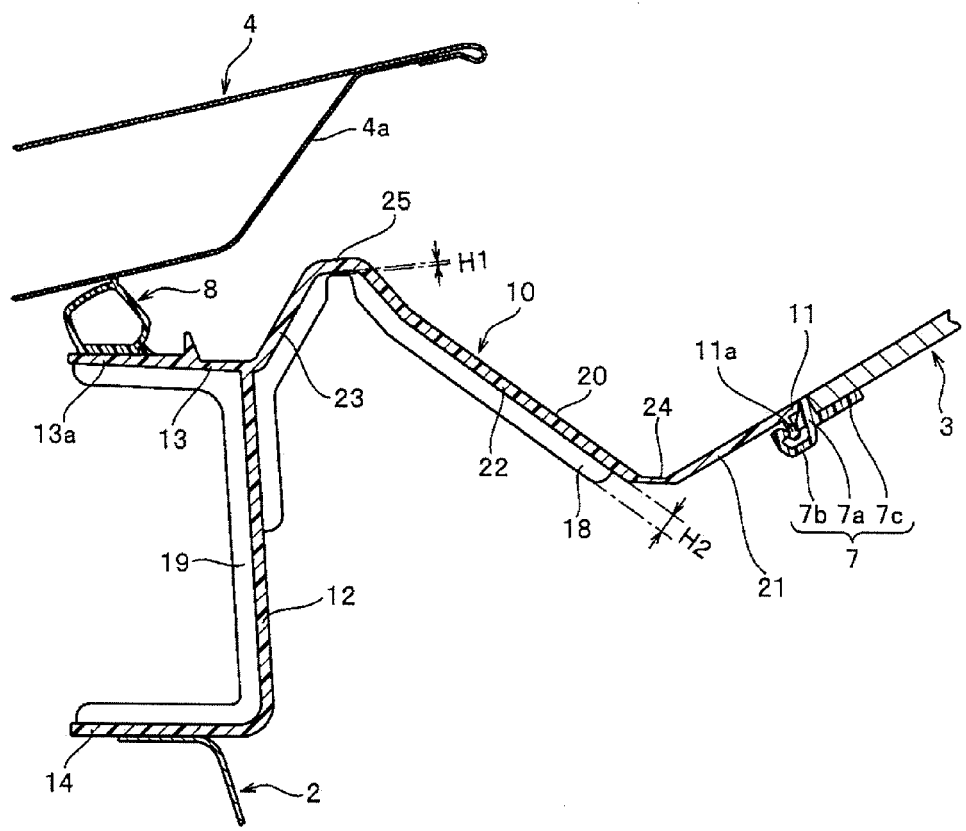
FIG. 2 is a cross-sectional view showing a cross section taken along a II-II line in FIG. 1, regarding a cowl top cover according to a first embodiment of the present invention.
Figure 3:
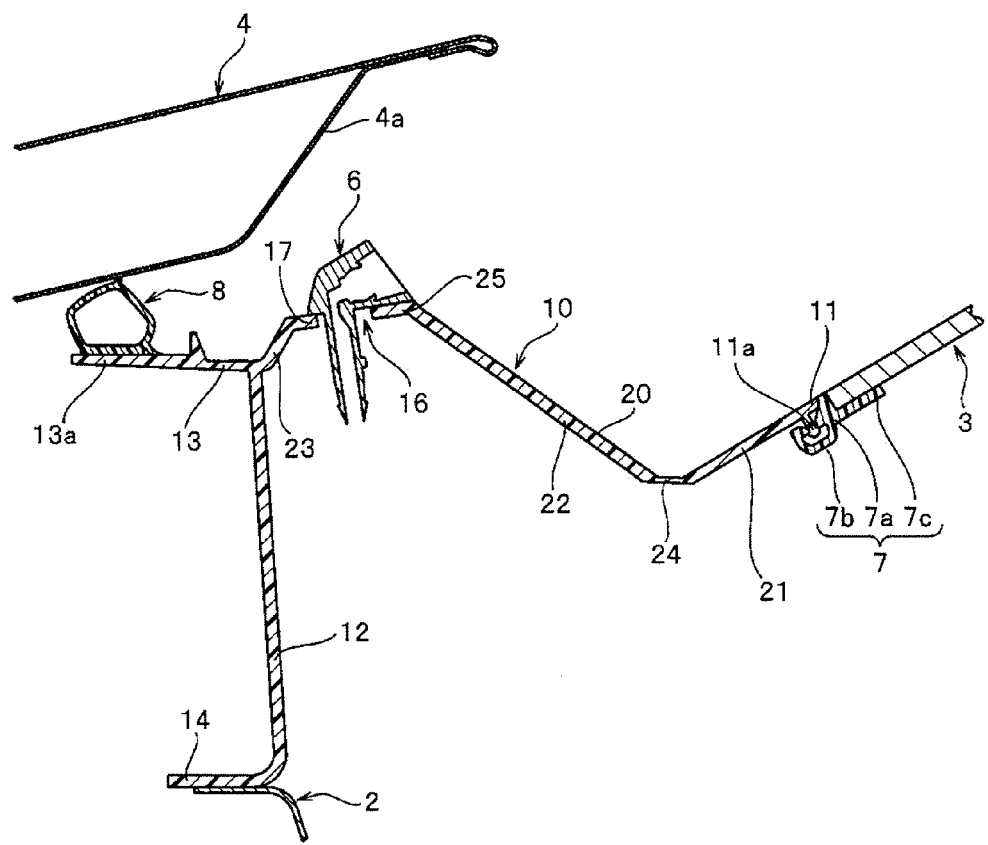
FIG. 3 is a cross-sectional view showing a cross section taken along a line in FIG. 1, regarding the cowl top cover according to the first embodiment of the present invention.

FIG. 1 is a perspective view showing a vehicle body front part of an automotive; FIG. 2 and FIG. 3 are cross-sectional views showing cross sections taken along a II-II line and a III-III line in FIG. 1, regarding a cowl top cover according to the present first embodiment.

It should be noted that in the description below, the term "front-rear direction" is a vehicle lengthwise direction, where "forward" is a direction in which an automotive moves forward and "backward" is a direction in which the automotive moves backward. The term "left-right direction" is a vehicle widthwise direction, where directions at a left side and a right side obtained when a driver faces forward are "leftward" and "rightward", respectively. The term "up-down direction" is a vehicle height direction, where a direction of a ground surface side relative to an automotive is "downward" and the opposite direction thereof is "upward".

In an automotive 1 shown in FIG. 1, a windshield 3 is disposed at a forward side of a vehicle compartment, and a bonnet hood 4 is disposed in a freely openable manner so as to cover an upward side of an unillustrated engine room disposed at a vehicle front part. The windshield 3 is disposed and upwardly inclined from the front end to the rear end. At the forward side of the windshield 3, a pair of left and right windshield wipers 5 are disposed, and the windshield wipers 5 is attached to enable rotation, by an unillustrated drive motor, on a glass surface of the windshield 3.

Between the bonnet hood 4 and the windshield 3, an unillustrated cowl part of which the upward side opens is disposed, and an air intake port of an unillustrated air conditioner for introducing an outside air into a vehicle compartment is connected to the cowl part. A cowl top cover 10 according to the first embodiment is attached, along the vehicle widthwise direction, to a vehicle body so that the cowl part is covered.

Further, a pair of left and right washer nozzles 6 are disposed (see FIG. 3) between the bonnet hood 4 and the windshield 3, inserted into a through-hole 16 (described later) formed in the cowl top cover 10, and attached to a nozzle attaching part 17 of the cowl top cover 10.

The cowl top cover 10 according to the first embodiment is formed by injection molding a thermoplastics resin such as polypropylene, acrylonitrile-butadiene-styrene copolymer, and polyamide based synthetic resin.

As shown in FIG. 2 and FIG. 3, the cowl top cover 10 includes: a cover body part 20 that covers the cowl part; a cover rear end 11 that is disposed at the windshield 3 side, which is a rear end side of the cover body part 20, and that is connected via a fitting member 7 to the windshield 3; a forward vertical wall part 12 that is disposed, at the front end of the cover body part 20, along an up-down direction so as to define an area between the engine room and the cowl part; an upward extended part 13 that is extended forward from an upper end of the forward vertical wall part 12; and a downward extended part 14 that is extended forward from a lower end of the forward vertical wall part 12.

The cover body part 20 of the cowl top cover 10 includes: in a region between the cover rear end 11 and the forward vertical wall part 12, a first inclined part 21 that is inclined downward toward a forward side from the cover rear end 11; a second inclined part 22 that is disposed at a forward side of the first inclined part 21 and that is inclined upward toward the forward side; a third inclined part 23 that is disposed at a forward side of the second inclined part 22 and that is inclined downward toward the forward side; a first bent part 24 that is formed to be bent in a valley-like shape so as to change an inclination direction of the cover body part 20 across the first inclined part 21 and the second inclined part 22; and a second bent part 25 that is formed to be bent in a mountain-like shape so as to change the inclination direction of the cover body part 20 across the second inclined part 22 and the third inclined part 23. The formation of the cover body part 20 provided with the first inclined part 21 to the third inclined part 23 and the first and second bent parts 24 and 25 is provided across the vehicle widthwise direction.

Further, in a predetermined region in a vehicle widthwise direction in the second bent part 25 of the cover body part 20, as shown in FIG. 3, a through-hole 16 through which the washer nozzle 6 is passed is formed to penetrate in a top-back direction of the cover body part 20, and at an upper surface part (top face part) of the second bent part 25, a nozzle attaching part 17 is arranged which fixes the washer nozzle 6 oriented toward a predetermined direction.

The cover rear end 11 of the cowl top cover 10 includes a base part disposed in parallel to the first inclined part 21 of the cover body part 20 and a locking pawl part 11a protruded to a back surface (surface opposite to a surface exposed to outside) of the base part. The locking pawl part 11a is of hook-like or mushroom-like shape, as viewed in the cross section, and is disposed continuously along the vehicle widthwise direction.

The fitting member 7 fitted into the cover rear end 11 is configured by rubber or a thermoplastic elastomer. Further, the fitting member 7 includes: an interposed part 7a, interposed between the cowl top cover 10 and the windshield 3, for preventing a direct contact between the cowl top cover 10 and the windshield 3; a fittingly attaching part 7b, disposed at a cowl top cover 10 side of the interposed part 7a, for fittingly attaching the locking pawl part 11a of the cover rear end 11; and a glass adhesion part 7c, disposed at the windshield 3 side of the interposed part 7a, for firmly adhering a back surface of the front end of the windshield 3 by adhesive, for example, where the fitting member 7 firmly adheres (bonds) the windshield 3 to the glass adhesion part 7c over the entire vehicle widthwise direction, and fittingly attaches the locking pawl part 11a of the cowl top cover 10 to the fittingly attaching part 7b over the entire vehicle widthwise direction. As a result, the cowl top cover 10 and the windshield 3 are connected via the fitting member 7, and a relative position relationship between the windshield 3 and the cowl top cover 10 is fixed.

In this case, the fitting member 7 includes a shape and a dimension that a top surface (outer surface) of the cowl top cover 10, a distal end surface (outer surface) of the interposed part 7a in the fitting member 7, and the glass surface outside the windshield 3 are on the continuous same plane, as shown in FIG. 2 and FIG. 3, when the cowl top cover 10 and the windshield 3 are connected. On the other hand, when a dimension error occurs in the windshield 3, for example, the fitting member 7 is not capable of absorbing the dimension error of the windshield 3, and the cover rear end 11 of the cowl top cover 10 is deformed due to the influence of the dimension error of the windshield 3.

The upward extended part 13 of the cowl top cover 10 is extended in a straight-line manner forward from the upper end of the forward vertical wall part 12. Further, on the upper surface of the front end in the upward extended part 13, the seal member fixation part 13a is disposed, and to the seal member fixation part 13a, an elastically deformable seal member 8 is fixed by an adhesive, for example.

In this case, the seal member 8 is formed in a tube-like shape by using rubber or a thermoplastic elastomer and the seal member 8 is fixed to the seal member fixation part 13a to be disposed at a predetermined position, and when the bonnet hood 4 is closed, the seal member 8 is thereby crimped by a reinforcement 4a disposed at a backside of the bonnet hood 4, and as a result, it is possible to seal an area between the upward extended part 13 of the cowl top cover 10 and the bonnet hood 4. This prevents a heat or a bad smell from the engine room from being leaked out to an upper surface side (in particular, an upper surface side of the cover body part 20) of the cowl top cover 10.

The downward extended part 14 of the cowl top cover 10 is extended in a straight-line manner from the lower end of the forward vertical wall part 12, via a curved part curved forward, forward. The downward extended part 14 is fixed to a support part of the vehicle body panel 2 by using an attaching member such as a U-lettered clip, for example.

Further, the cowl top cover 10 according to the first embodiment includes: a first stiffening rib 18 erected on a wall surface oriented to a cowl part side of the cover body part 20 and the forward vertical wall part 12; and a second stiffening rib 19 erected on a wall surface oriented to an engine room side of the forward vertical wall part 12 and the upper and lower extended parts 13 and 14, as shown in FIG. 2.

Further, the first stiffening rib 18 is disposed along a vehicle lengthwise direction across the end at a first bent part 24 side in the second inclined part 22 of the cover body part 20 and a substantially central part in the up-down direction of the forward vertical wall part 12, as viewed in the cross section of the cowl top cover 10. The second stiffening rib 19 is disposed along a vehicle lengthwise direction across the front end of the upward extended part 13, via the forward vertical wall part 12, and the front end of the downward extended part 14.

A plurality of first and second stiffening ribs 18 and 19 are formed along a vehicle lengthwise direction with a predetermined interval, in a predetermined region in a vehicle widthwise direction of the cowl top cover 10. This increases the rigidity of a region at a front half side of the cowl top cover 10 in a vehicle lengthwise direction so as to maintain the shape, and as a result, it is possible to stabilize a shape of the nozzle attaching part 17 of the cowl top cover 10 or a height position of the seal member fixation part 13a, for example.

In such a cowl top cover 10 according to the first embodiment, the first bent part 24 of the cover body part 20 includes a first flexural deformation structure configured by locally making the thickness of the cover body part 20 thinner than the thickness of other parts of the cover body part 20 (in other words, a thinner part or a cut-off part is set to the first bent part 24). The first flexural deformation structure (that is, the thinner part on the first bent part 24) is arranged over the entire vehicle widthwise direction of the cowl top cover 10.

It should be noted that in the present invention, the thickness of the cover body part 20 is a dimension of the shortest distance between the top surface and the back surface of the cover body part 20. Further, the thickness in the first inclined part 21 to the third inclined part 23 according to the first embodiment is set to a constant size by which it is possible to obtain a rigidity to hold a whole shape of the cowl top cover 10 with a relatively stability.

When the first bent part 24 of the cover body part 20 includes the first flexural deformation structure in this way, it is possible to locally decrease the rigidity of the first bent part 24, and it is thereby possible to easily and partially flex the first bent part 24 along a vehicle lengthwise direction as compared, for example, to the first inclined part 21 to the third inclined part 23. That is, when such a first flexural deformation structure is provided, the first bent part 24 is flexed, and it is thereby possible to allow an increase or decrease of an angle at which the first inclined part 21 and the second inclined part 22 are formed, via the first bent part 24, at an inner peripheral side, and as a result, it is possible to easily achieve expansion and contraction of a distance, in the vehicle lengthwise direction, between the locking pawl part 11a and the seal member fixation part 13a.

In this case, it is set such that the smallest dimension of the thickness in the first bent part 24 is equal to or less than 75% of the thickness of the first inclined part 21 to the third inclined part 23, preferably, equal to or less than 60%. For example, in the present first embodiment, the thickness in the first inclined part 21 to the third inclined part 23 of the cover body part 20 is set to between 2 mm and 2.5 mm inclusive, and the smallest dimension in the thickness of the first inclined part 24 is set to equal to or less than 1.2 mm.

When the thickness of the first bent part 24 is thinned within the above-described range, it is possible to facilitate flexure of the first bent part 24 with a relatively small force. On the other hand, it is preferably set that the smallest dimension of the thickness in the first bent part 24 is equal to or more than 25% of the thickness of the first inclined part 21 to the third inclined part 23, in particular, equal to or more than 40%. As a result, it is possible to prevent the thickness of the first bent part 24 from becoming too thin, and it is thereby possible to prevent a decrease in feature such as strength, moldability, and appearance quality of the cowl top cover 10.

Further, in the cowl top cover 10 according to the first embodiment, the second bent part 25 of the cover body part 20 includes a second flexural deformation structure configured by locally lowering the erected height of a portion disposed on the second bent part 25 of the first stiffening rib 18 (in other words, by forming a notch toward a rib terminal end from a rib distal end in a portion disposed on the second bent part 25 of the first stiffening rib 18).

It should be noted that in the first embodiment, the second flexural deformation structure (that is, the notch of the first stiffening rib 18) may be arranged in all the first stiffening ribs 18 disposed in a predetermined region of the cowl top cover 10, and may also be arranged in some first stiffening ribs 18 only, out of the first stiffening ribs 18 disposed in the predetermined region. This can be arbitrarily selected according to a type of the cowl top cover 10 and a type of the automotive 1 to which the cowl top cover 10 is attached.

Further, in the present invention, the erected height of the first stiffening rib 18 is a height dimension of the stiffening rib in a direction orthogonal to the wall surface of the cover body part 20 and the forward vertical wall part 12 in which the first stiffening rib 18 is formed, and in a case of the first embodiment, the erected height of the first stiffening rib 18 disposed in a region of the second inclined part 22, the third inclined part 23, and the forward vertical wall part 12 is set to a constant size.

In this way, when the second bent part 25 of the cover body part 20 includes the second flexural deformation structure, it is possible to locally decrease the rigidity of the second bent part 25 as compared to the other regions where the first stiffening rib 18 is disposed, and it is possible to facilitate a partial flexure of the second bent part 25 along a vehicle lengthwise direction. That is, when such a second flexural deformation structure is provided, the second bent part 25 is flexed to thereby increase or decrease the angle formed at an inner peripheral side, via the second bent part 25, by the second inclined part 22 and the third inclined part 23, and as a result, it is possible to easily achieve expansion and contraction of a distance, in the vehicle lengthwise direction, between the locking pawl part 11a and the seal member fixation part 13a.

In this case, an erected height H1 of the first stiffening rib 18 in the second bent part 25 is set to equal to or less than 25% of an erected height H2 of the first stiffening rib 18 disposed in a region of the second inclined part 22, the third inclined part 23, and the forward vertical wall part 12, and preferably, set to equal to or less than 10% thereof. When the erected height of the first stiffening rib 18 is lowered within such a range, it is possible to facilitate flexure of the second bent part 25 with a relatively small force. It should be noted that in the present invention, it is also possible to configure the second flexural deformation structure by partially cutting a portion disposed on the second bent part 25 of the first stiffening rib 18.

According to the cowl top cover 10 of the first embodiment having a configuration described above, when the cowl top cover 10 is connected to the front end of the windshield 3 and assembled into the vehicle body, even if the cover rear end 11 of the cowl top cover 10 is relatively deformed relative to the vehicle body as a result of the dimension error occurring to a component such as the windshield 3 and the cowl top cover 10 or the adhesion position of the fitting member 7 bonded to the windshield 3 being shifted, it is possible to effectively absorb the dimension error of a component and the positional shift when the first and second bent parts 24 and 25 of the cowl top cover 10 has the above-described first and second flexural deformation structures to thereby allow a locally flexural deformation.

In particular, in a case of the present first embodiment, when the first bent part 24 disposed at a rear half side of the cowl top cover 10 in a vehicle lengthwise direction (front-rear direction) is flexed and deformed over the entire vehicle widthwise direction, it is possible to change the inclination angle of the first inclined part 21 or the second inclined part 22 over the entire vehicle widthwise direction. As a result, even when the above-described dimension error or positional shift occurs, it is possible to stabilize the relative position, relative to the vehicle body, of the nozzle attaching part 17 or the seal member fixation part 13a disposed at a front half side of the cowl top cover 10, and it is also possible to prevent a disposition angle of the nozzle attaching part 17 from being shifted.

Therefore, in the cowl top cover 10 according to the first embodiment, it is possible to ensure that the position and the angle of the washer nozzle 6 attached to the nozzle attaching part 17 of the cover body part 20 or the position of the seal member 8 fixed to the seal member fixation part 13a of the upward extended part 13 has less of an influence from the dimension error or the positional shift of a component such as the windshield 3.

As a result, it is possible to stably ensure the sealability between the cowl top cover 10 and the bonnet hood 4 by the seal member 8. Further, it is possible to stably inject liquid such as water from the washer nozzle 6 attached to the cowl top cover 10 toward a predetermined direction, and the performance of the washer nozzle 6 will not be decreased.

It should be noted that in the present first embodiment, for example, when the thickness in the second bent part 25 of the cover body part 20 is locally thinned than the thickness of the first inclined part 21 to the third inclined part 23, it is possible to further configure a third flexural deformation structure, and it is thereby possible to further facilitate a partial flexure of the second bent part 25. Further, in the cowl top cover according to the present invention, it is possible to adopt only one of the first flexural deformation structure and the second flexural deformation structure in the first embodiment.

Second Embodiment

Figure 4:
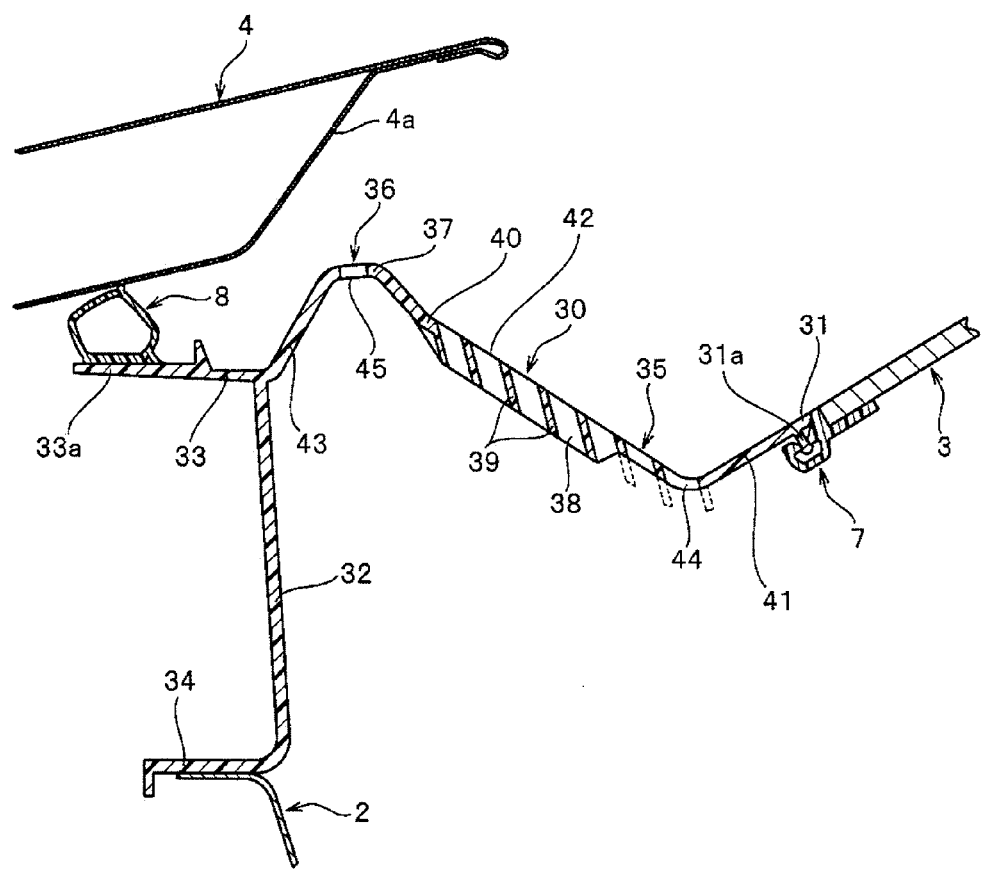
FIG. 4 is a cross-sectional view showing a cross section of a cowl top cover according to a second embodiment of the present invention.
Figure 5:
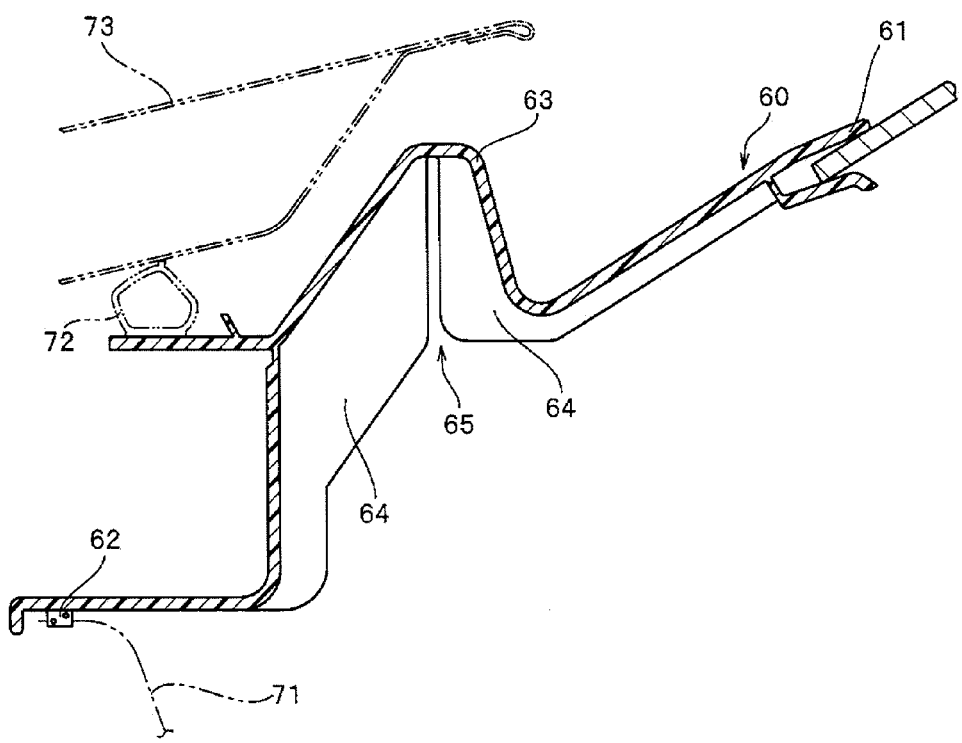
FIG. 5 is a cross-sectional view showing a cross section of a conventional cowl top cover.

FIG. 4 is a cross-sectional view showing a cross section of a cowl top cover according to a second embodiment.

It should be noted that in the present second embodiment, a component and a member having the substantially same configuration as the member or the component described in the above-described first embodiment will be imparted with the same symbols to thereby omit the description.

A cowl top cover 30 according to the present second embodiment is formed by injection molding a thermoplastics resin such as polypropylene, in much the same way as in the cowl top cover 10 according to the above-described first embodiment. Further, the cowl top cover 30 includes: a cover body part 40; a cover rear end 31 that is disposed at a rear end side of the cover body part 40 and that is connected via the fitting member 7 to the windshield 3; a forward vertical wall part 32 disposed, along an up-down direction, in the front end of the cover body part 40; an upward extended part 33 that is extended forward from an upper end of the forward vertical wall part 32; and a downward extended part 34 that is extended forward from a lower end of the forward vertical wall part 32.

The cover body part 40 includes: a first inclined part 41 that is inclined downward toward the forward side from the cover rear end 31; a second inclined part 42 that is disposed at a forward side of the first inclined part 41 and that is inclined upward toward the forward side; a third inclined part 43 that is disposed at a forward side of the second inclined part 42 and that is inclined downward toward the forward side; a first bent part 44 that is formed to be bent in a valley-like shape so as to change an inclination direction of the cover body part 40 across the first inclined part 41 and the second inclined part 42; and a second bent part 45 that is formed to be bent in a mountain-like shape so as to change the inclination direction of the cover body part 40 across the second inclined part 42 and the third inclined part 43.

In a predetermined region in a vehicle widthwise direction in the second bent part 45 of the cover body part 40, a through-hole 36 through which an unillustrated washer nozzle is passed is formed to penetrate in a top-back direction of the cover body part 40, and at an upper surface part (top face part) of the second bent part 45, a nozzle attaching part 37 is arranged which fixes the washer nozzle oriented toward a predetermined direction.

Further, in the first bent part 44 and the second inclined part 42 of the cover body part 40, an air intake port (intake port) 35 for introducing an outside air into the vehicle is arranged in a predetermined region in a vehicle widthwise direction, and the air intake port 35 is formed in lattice by a plurality of vertical lattice parts (first lattice parts) 38 disposed in line along a vehicle lengthwise direction and a plurality of horizontal lattice parts (second lattice parts) 39 disposed in line along a vehicle widthwise direction. In this case, an upper end surface of the vertical lattice parts 38 and the horizontal lattice parts 39 (that is, a top surface of the air intake port 35), is formed in a continuous smooth single surface.

The first bent part 44 of the cover body part 40 in the present second embodiment includes a flexural deformation structure configured by locally cutting a portion disposed on the first bent part 44 of the vertical lattice parts 38 and the horizontal lattice parts 39. That is, in a case of the present second embodiment, the vertical lattice parts 38 and the horizontal lattice parts 39 disposed at a front end side of the second inclined part 42 is formed such that the erected height from the back surface of the second inclined part 42 is set to a constant size. On the other hand, the first bent part 44 is configured as follows: in a conventional cowl top cover, for example, as shown by a dotted line in FIG. 4, the vertical lattice parts 38 and the horizontal lattice parts 39 provided with a constant erected height are erected; on the other hand, in the cowl top cover 30 according to the present second embodiment, these vertical lattice parts 38 and the horizontal lattice parts 39 are removed and an opening is formed while a thickness portion only of the first bent part 44 and the second inclined part 42 is left. Therefore, in the first bent part 44 according to the present second embodiment, the opening for taking in an outside air is formed in the cover body part 40 itself; however, the vertical lattice parts 38 and the horizontal lattice parts 39 are not formed.

It should be noted that in the present invention, when the vertical lattice parts 38 and the horizontal lattice parts 39 are erected in the first bent part 44 (in other words, when the vertical lattice parts 38 and the horizontal lattice parts 39 of the first bent part 44 are not removed), for example, if the erected height of the vertical lattice parts 38 and the horizontal lattice parts 39 disposed in the first bent part 44 is set lower than that of the vertical lattice parts 38 and the horizontal lattice parts 39 disposed at a front end side of the second inclined part 42, then it becomes possible to arrange the flexural deformation structure in the first bent part 44 of the cover body part 40. In this case, the erected height of the vertical lattice parts 38 and the horizontal lattice parts 39 in the first bent part 44 preferably is set to equal to or less than 25%, in particular, equal to or less than 10% of the erected height of the vertical lattice parts 38 and the horizontal lattice parts 39 disposed at a front end side of the in the second inclined part 42.

Further, in the present second embodiment, the flexural deformation structure of the first bent part 44 (that is, a portion obtained by cutting the vertical lattice parts 38 and the horizontal lattice parts 39) may be formed over the entire region where the air intake port 35 in a vehicle widthwise direction is disposed, or may be formed only in a part of the region where the air intake port 35 in a vehicle widthwise direction is disposed.

In this way, when the first bent part 44 of the cover body part 40 includes the flexural deformation structure, it is possible to locally and greatly decrease the rigidity of the first bent part 44 resulting from the formation of the opening in the first bent part 44, and it is thus possible to facilitate a partial flexure of the second bent part 45 along a vehicle lengthwise direction.

The cover rear end 31 of the cowl top cover 30 is formed by including, continuously in a vehicle widthwise direction, a base part disposed in parallel to the first inclined part 41 of the cover body part 40 and a locking pawl part 31a protruded to a back surface of the base part. Further, the locking pawl part 31a is of hook-like or mushroom-like shape, as viewed in the cross section, so that it is possible to fittingly attach to the fitting member 7.

The upward extended part 33 of the cowl top cover 30 is extended in a straight-line manner forward from the upper end of the forward vertical wall part 32. Further, on the upper surface of the front end in the upward extended part 33, a seal member fixation part 33a is disposed, and to the seal member fixation part 33a, the elastically deformable seal member 8 is fixed by an adhesive, for example. The downward extended part 34 of the cowl top cover 30 is extended in a straight-line manner from the lower end of the forward vertical wall part 32, via a curved part curved forward, forward.

According to the cowl top cover 30 of the present second embodiment having a configuration described above, when the cowl top cover 30 is connected to the front end of the windshield 3 and attached into the vehicle body, even if a dimension error of a component or a positional shift occurs, the first bent part 44 of the cowl top cover 30 is locally flexed and deformed as a result of the provision of the above-described flexural deformation structure and it is thereby possible to effectively absorb the dimension error or the positional shift.

Therefore, in the cowl top cover 30 according to the present second embodiment, it is possible to stably ensure the sealability between the cowl top cover 30 and the bonnet hood 4 by the seal member 8 and it is also possible to prevent a decrease in performance of the washer nozzle, in much the same way as in the above-described first embodiment.

What is claimed is:

1. A cowl top cover that covers a cowl part disposed between a windshield and a bonnet hood of an automotive, comprising:
    a locking pawl part disposed at first end of the cowl top cover in a vehicle lengthwise direction;
    a seal member fixation part for fixing a seal member, the seal member fixation part disposed at a second end of the cowl top cover in the vehicle lengthwise direction;
    first and second bent parts disposed between the first end of the cowl top cover and the second end of the cowl top cover, the first bent part being formed to be bent in a mountain-like shape and the second bent part being formed to be bent in a valley-like shape, in a vehicle height direction as viewed in a cross section orthogonal to a vehicle widthwise direction;
    the first end of the cowl top cover being connected to a front end of the windshield via a fitting member to which the locking pawl part is fittingly attached; and
    the second end of the cowl top cover including sealing between the bonnet hood of the automotive via the seal member fixed to the seal member fixation part,
    wherein the first and second bent parts include a flexural deformation structure to allow a locally flexural deformation, in the vehicle lengthwise direction, in the first and second bent parts and to enable an expansion and contraction of a distance in the vehicle lengthwise direction between the locking pawl part and the seal member fixation part.

2. The cowl top cover according to claim 1, wherein the flexural deformation structure is configured such that a thickness of at least one of the first and second bent parts is locally thinned.

3. The cowl top cover according to claim 1, wherein a stiffening rib is erected along the vehicle lengthwise direction at a back surface of the cowl top cover, and
    the flexural deformation structure is configured such that a portion disposed on the first and second bent parts of the stiffening rib is locally cut or an erected height in the portion disposed on the first and second bent parts of the stiffening rib is locally lowered.

4. The cowl top cover according to claim 1, wherein in a predetermined region including the first and second bent parts of the cowl top cover, a lattice-like air intake port is disposed which is configured by a plurality first lattice parts disposed in line along a first direction, and
    a plurality second lattice parts disposed in line along a second direction different from the first direction, and
    the flexural deformation structure is configured such that a portion disposed on the first and second bent parts of the first and second lattice parts is locally cut or an erected height in the portion disposed on the first and second bent parts of the first and second lattice parts is locally lowered.

\* \* \* \* \*